United States Patent [19]

Sato et al.

[11] Patent Number: 4,571,362
[45] Date of Patent: Feb. 18, 1986

[54] MAGNETIC RECORDING MEDIUM

[75] Inventors: Nobuhiro Sato, Saku; Akira Okada; Yutaka Nakashima, both of Komoro, all of Japan

[73] Assignee: TDK Electronics Co., Ltd., Tokyo, Japan

[21] Appl. No.: 420,903

[22] Filed: Sep. 21, 1982

Related U.S. Application Data

[63] Continuation of Ser. No. 275,708, Jun. 22, 1981, abandoned.

[30] Foreign Application Priority Data

Jun. 23, 1980 [JP] Japan .................................. 55-84846

[51] Int. Cl.$^4$ ............................................ H01F 10/02
[52] U.S. Cl. .................................. 428/329; 428/694; 428/900

[58] Field of Search ................................ 427/127–132, 427/48; 252/62.54; 428/900, 694, 329

[56] References Cited

U.S. PATENT DOCUMENTS 3,959,553  5/1976  Hartmann et al. .................. 428/329

Primary Examiner—Bernard D. Pianalto
Attorney, Agent, or Firm—Wyatt, Gerber, Shoup, Scobey and Badie

[57] ABSTRACT

A magnetic recording medium contains, in the coating layer of a magnetic powder, 0.5–15% by weight of at least either nonmagnetic powder of $Al_2O_3$ or $Cr_2O_3$ and 0.5–15% by weight of $\alpha$-$Fe_2O_3$, the sum of the proportions of the nonmagnetic powder and $\alpha$-$Fe_2O_3$ not exceeding 20% by weight, all on the basis of the weight of the magnetic powder. The nonmagnetic powder and $\alpha Fe_2O_3$ both range in particle size from 0.1 to 2 $\mu$m.

5 Claims, 3 Drawing Figures

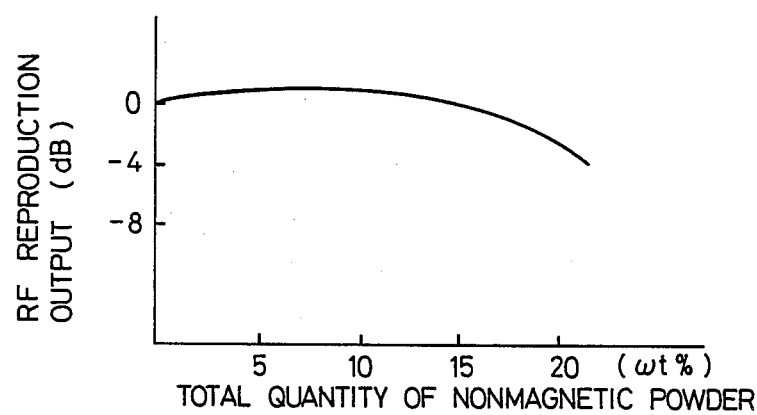
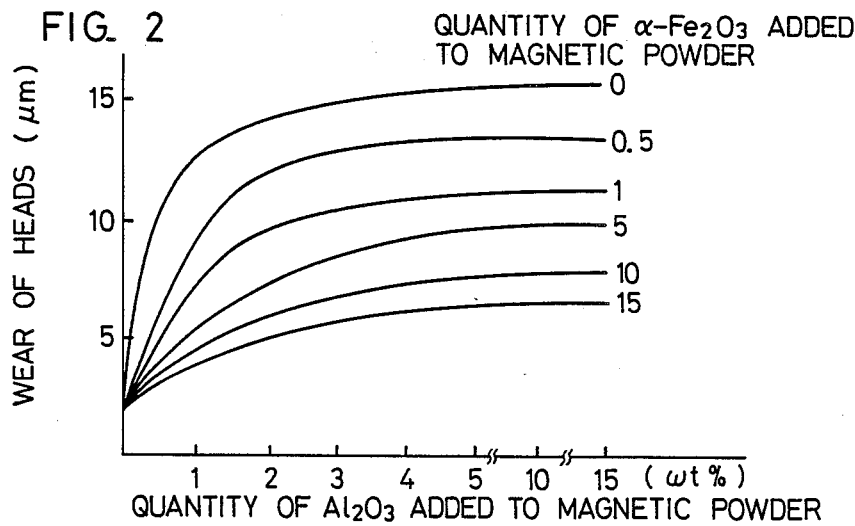
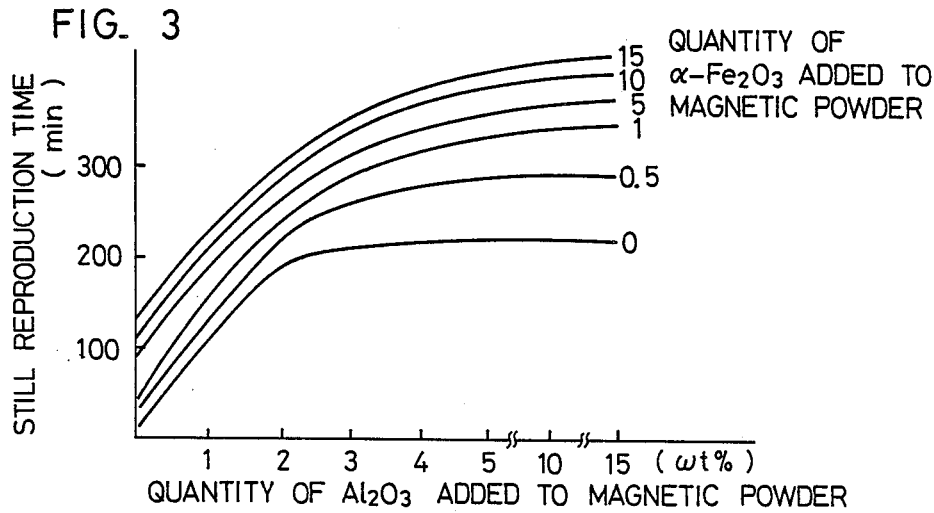

4,571,362

MAGNETIC RECORDING MEDIUM

This is a continuation, of application Ser. No. 275,708 filed June 22, 1981 now abandoned.

BACKGROUND OF THE INVENTION

This invention relates to a magnetic recording medium, and more specifically to such a medium which combines an improved still reproduction property with good resistance to wear on repeated running past heads.

One of the essential characteristics required of the magnetic recording medium is the still property. If satisfactory still reproduction is to be ensured in playing back television signals by a video tape recorder, the wear of the magnetic tape surface due to the drawing of the tape past the heads must be avoided. During the still reproduction, for example, one existing system scans an arcuately formed tape portion near a rotating head with two magnetic heads which are mounted 180 deg. apart on a rotating drum and are revolved at a high speed. If the tape is not wear-resistant, the tape surface will be gradually scraped out, resulting in a shorter still reproduction time.

In order to improve the still reproduction property, it has been customary to incorporate a nonmagnetic powder harder than $Cr_2O_3$, $Al_2O_3$ or other magnetic powder into the coating layer of the tape. As is known in the art, this improves the wear resistance of the tape but that of the heads has to be seriously sacrificed. After all, this type of magnetic recording medium is required to meet the two contradictory requirements, i.e., improved still reproduction property due to increased wear resistance of the tape and reduced wear of the heads. To achieve the dual end, it is necessary to take steps to minimize the head wear and improve the still property.

BRIEF SUMMARY OF THE INVENTION

Our extensive search for the nonmagnetic powder to be contained in the coating on the tape has led to a finding that proper blending of a nonmagnetic powder, which gives a good still property although it invites considerable head wear, with another nonmagnetic powder, which causes less head wear with a sacrifice of the still property, will produce a synergetic effect with which the blend will bring a better still property than when the powders are used singly, while limiting the head wear within a permissible range. It has also been found desirable that the former powder is one generally in use for the improvement of the still property, such as the particles of $Cr_2O_3$, $Al_2O_3$ or the like or a mixture thereof, and the latter is $\alpha\text{-}Fe_2O_3$. These findings have formed the basis of the present invention.

BRIEF DESCRIPTION OF THE DRAWINGS

FIG. 1 is a graph showing the relation between the total quantity in percent by weight of a nonmagnetic powdery mixture and the RF reproduction output (dB); and FIGS. 2 and 3 are graphs showing the relations between the proportions of $Al_2O_3$-$\alpha$-$Fe_2O_3$ nonmagnetic powdery mixtures in coating mixtures and the head wear ($\mu$m) and still reproduction time (min), respectively.

DETAILED DESCRIPTION OF THE INVENTION

The introduction of the two powders of different properties into the coating composition is accomplished in usual manner by mixing the magnetic powder with a binder and additives, adding the nonmagnetic powdery mixture to the magnetic mixture, if necessary with a suitable hardening agent, and then applying the resulting magnetic coating material to the base by a usual method. It is, of course, possible as an alternative to knead the nonmagnetic and magnetic powders together from the very beginning.

The combined amount of the nonmagnetic powdery mixture to be added should not be too large, because, being nonmagnetic, the mixture will deteriorate the electromagnetic properties of the resulting coating. The graph in FIG. 1 shows the relation between the proportion of the total nonmagnetic powder amount to the magnetic powder. As will be obvious from this graph, the nonmagnetic powder amount is desired to be not more than 20% by weight on the basis of the weight of the magnetic powder. While the graph carries data on the mixture of $Al_2O_3$ and $\alpha$-$Fe_2O_3$ powders as nonmagnetic powders, a similar tendency is observed with a $Cr_2O_3$-$\alpha$-$Fe_2O_3$ mixture.

As regards the mixing ratio of the two different powders, it is to be noted that the proportioning governs the wear of the heads and the still property in terms of still reproduction time, as will be demonstrated by examples later. Therefore, after careful consideration of the two properties, the optimum ratio should be found in the quantitative relation where a good balance is attained between the two. In arriving at the optimum value, the afore-described limitation to the total amount should, of course, be taken into account. Usually the optimum proportion is chosen from the range of 0.5–15% by weight.

The size of the nonmagnetic particles generally has a tendency such that the coarser the particles the better the still property while the greater the wear of the heads will be. If the particles are too fine the still property will aggravate, and if too coarse, there will be an adverse effect upon the electromagnetic property of the coating composition. For these reasons, a particle size in the range of 0.1–2 $\mu$m is suitable.

The invention is illustrated by the following examples.

EXAMPLE 1

A magnetic-powder-containing composition was prepared from:

| | |
|---|---|
| Co—containing iron oxide magnetic powder | 400 g |
| Nitrocellulose | 30 |
| Polyvinyl chloride | 15 |
| Urethane elastomer | 40 |
| Carbon | 20 |

Equally divided portions of this composition were mixed with $\alpha$-$Fe_2O_3$ and $Al_2O_3$ in varied ratios to prepare magnetic coating materials. After the addition of an isocyanate type hardening agent, each coating material was applied to a polyester film, forming a coating layer about 5 $\mu$m thick thereon, thus producing a magnetic tape.

The graph in FIG. 2 indicates the relation between the proportions of $Al_2O_3$ and $\alpha\text{-}Fe_2O_3$ to the magnetic powder and the wear of heads. It will be appreciated from this graph that, when $Al_2O_3$ alone is used, or when the $\alpha\text{-}Fe_2O_3$ content is 0%, the head wear is very considerable, even if the proportion of $Al_2O_3$ is merely about 1%. Clearly, when $Al_2O_3$ is on the low side, the wear of the heads will be greater with an increase in the amount of $Al_2O_3$, while the wear will be lessened with an increase in $\alpha\text{-}Fe_2O_3$.

Similarly, the graph in FIG. 3 shows the relation between the proportions of $Al_2O_3$ and $\alpha\text{-}Fe_2O_3$ and the still reproduction time. If $Al_2O_3$ is insufficient the still reproduction time will be very short. Particularly where the $Al_2O_3$ content is 0%, the still reproduction time will be little extended by any increase in the $\alpha\text{-}Fe_2O_3$ proportion. If the $Al_2O_3$ content exceeds 3% the still reproduction time will be about 220 minutes. More importantly, a further increase in the $Al_2O_3$ proportion will result in a longer still reproduction time.

Thus, by admixing $Al_2O_3$ with a $\alpha\text{-}Fe_2O_3$ it is possible to extend the still reproduction time, 80 to 100 minutes longer than when only $Al_2O_3$ is used, and also reduce the wear of the heads to one-half to one-third that with $Al_2O_3$ alone. In other factors, such as head surface roughing and tape surface quality, the combined use of the mixture gives results as good as or better than when $Al_2O_3$ alone is employed. A satisfactory compromise between the head wear and still property is attained by choosing the amount of $\alpha\text{-}Fe_2O_3$ from the range of 5–15% and $Al_2O_3$ from the range of 3–15%.

EXAMPLE 2

Magnetic tapes were made by repeating the procedure of Example 1 with the exception that polyvinyl chloride in those magnetic coating compositions was replaced by polyester in similarly varied amounts. The same head wear and still reproduction time characteristics as indicated in FIGS. 2 and 3 were achieved. Results similar to those in Example 1 were obtained when magnetic coating materials were prepared from the same compositions of Example 1 except for nitrocellulose. When magnetic tapes were made using a plastic system without the isocyanate type hardening agent of the preceding example, generally the same results were obtained as graphically represented in FIGS. 2 and 3, though some decline in the still property was observed. Experiments were also made using binders other than those employed in Example 1 and this example, viz., the known resins of thermoplastic, thermosetting, and reactive types and their mixtures. Except for slight numerical variations, the still property and head wear generally showed the same tendencies as represented in FIGS. 2 and 3. This means that, in the practice of the present invention, any binder and additives may be employed with practically no unfavorable influence.

EXAMPLE 3

Magnetic tapes were made in the same manner as described in Example 1, except that the Co-containing iron oxide magnetic powder was replaced by the powder of $\gamma\text{-}Fe_2O_3$, $Fe_3O_4$, Co-containing $Fe_3O_4$, ferromagnetic alloy, or their mixture. The products, tested for the evaluation of their properties, gave results similar to those graphically shown in FIGS. 2 and 3.

EXAMPLE 4

Excepting the use of $Cr_2O_3$ in place of $Al_2O_3$ as one of the nonmagnetic powders, the procedure and tests of Example 1 were repeated. Aside from minor differences in absolute values, graphs of similar tendencies to FIGS. 2 and 3 were drawn of all the combinations tested.

What is claimed is:

1. A magnetic recording medium comprising a base material and a coating layer formed thereon, said coating layer comprising a magnetic powder and 0.5–15% by weight of at least one nonmagnetic powder of $Al_2O_3$ and $Cr_2O_3$ and 0.5–15% by weight of $\alpha\text{-}Fe_2O_3$, the sum of the proportions of said nonmagnetic powder and $\alpha\text{-}Fe_2O_3$ not exceeding 20% by weight, all on the basis of the weight of said magnetic powder.

2. A magnetic recording medium according to claim 1 wherein both the nonmagnetic powder and $\alpha\text{-}Fe_2O_3$ have particle sizes in the range of 0.1–2 $\mu m$ in diameter.

3. A magnetic recording medium according to claim 1 wherein the magnetic powder is Co-containing iron oxide.

4. A magnetic recording medium according to claim 1 wherein the magnetic powder is selected from the group consisting of $\gamma\text{-}Fe_2O_3$ powder, $Fe_3O_4$ powder, Co-containing $Fe_3O_4$ powder, ferromagnetic allow powder and mixtures thereof.

5. A magnetic recording medium according to claims 1, 2, 3, or 4 wherein the coating layer additionally contains an isocyanate-type curing agent.

* * * * *